US008692710B2

(12) United States Patent
Tarlow et al.

(10) Patent No.: US 8,692,710 B2
(45) Date of Patent: Apr. 8, 2014

(54) APPARATUS AND METHOD FOR USE IN GLOBAL POSITIONING MEASUREMENTS

(75) Inventors: Ben Tarlow, Cottenham (GB); Stuart Strickland, Bishop's Stortford (GB)

(73) Assignee: SiGe Semiconductor (Europe) Limited (GB)

( * ) Notice: Subject to any disclaimer, the term of this patent is extended or adjusted under 35 U.S.C. 154(b) by 371 days.

(21) Appl. No.: 12/310,552

(22) PCT Filed: Aug. 31, 2007

(86) PCT No.: PCT/CA2007/001519
§ 371 (c)(1),
(2), (4) Date: Jun. 7, 2010

(87) PCT Pub. No.: WO2008/025150
PCT Pub. Date: Mar. 6, 2008

(65) Prior Publication Data
US 2010/0232476 A1    Sep. 16, 2010

Related U.S. Application Data

(60) Provisional application No. 60/841,217, filed on Aug. 31, 2006.

(51) Int. Cl.
*G01S 19/22*     (2010.01)
*G01C 21/00*    (2006.01)

(52) U.S. Cl.
USPC ........................................ 342/357.61; 701/412

(58) Field of Classification Search
USPC ......... 342/357.61, 357.59; 701/210, 411, 412
See application file for complete search history.

(56) References Cited

U.S. PATENT DOCUMENTS

| 4,949,268 | A  | * | 8/1990 | Nishikawa et al. | ........... 701/454 |
| 5,347,536 | A  |   | 9/1994 | Meehan | |
| 5,731,978 | A  | * | 3/1998 | Tamai et al. | .................. 701/410 |
| 6,021,374 | A  |   | 2/2000 | Wood | |
| 6,292,132 | B1 |   | 9/2001 | Wilson | |
| 6,452,545 | B2 |   | 9/2002 | Araki et al. | |
| 6,657,584 | B2 | * | 12/2003 | Cavallaro et al. | ........ 342/357.61 |
| 6,871,139 | B2 | * | 3/2005 | Liu et al. | ........................ 701/410 |
| 6,900,758 | B1 | * | 5/2005 | Mann et al. | .............. 342/357.42 |
| 7,149,533 | B2 | * | 12/2006 | Laird et al. | .................. 455/456.3 |
| 7,428,461 | B2 | * | 9/2008 | Ohnishi et al. | ................. 701/454 |
| 7,642,958 | B2 | * | 1/2010 | Bernhardt et al. | ....... 342/357.31 |

(Continued)

FOREIGN PATENT DOCUMENTS

JP         2005195493  A  *  7/2005  ................ G01S 5/14

OTHER PUBLICATIONS

International Search Report, International Application No. PCT/CA2007/001519, Dec. 18, 2007.

*Primary Examiner* — Cassie Galt
(74) *Attorney, Agent, or Firm* — Knobbe, Martens, Olson & Bear, LLP

(57) ABSTRACT

Embodiments of the invention involve providing assistance data to a global position and navigation receiver, for example topographical data, such that the receiver can decide on a specific action depending on that data. The topographical data may include one or both of geographical data and architectural data. Geographical data may include information about natural formations, such as hills, valleys, forests, etc. Architectural data may include manmade formations, such as streets, buildings, bridges, etc. The receiver may then interpret and decide on a course of action for controlling the receiver base on the assistance data.

32 Claims, 4 Drawing Sheets

(56) References Cited

U.S. PATENT DOCUMENTS

| | | | |
|---|---|---|---|
| 7,840,220 B1* | 11/2010 | Mitchell | 455/452.2 |
| 7,907,088 B2* | 3/2011 | Terashima et al. | 342/357.61 |
| 2002/0050944 A1* | 5/2002 | Sheynblat et al. | 342/357.06 |
| 2002/0169545 A1* | 11/2002 | Toyooka | 701/207 |
| 2006/0238418 A1* | 10/2006 | Monnerat et al. | 342/357.09 |
| 2006/0293852 A1* | 12/2006 | Tsurumi | 701/216 |
| 2012/0059578 A1* | 3/2012 | Venkatraman | 701/411 |
| 2012/0158237 A1* | 6/2012 | Lee et al. | 701/26 |

* cited by examiner

APPARATUS AND METHOD FOR USE IN GLOBAL POSITIONING MEASUREMENTS

RELATED APPLICATIONS

This application claims the benefit of U.S. Provisional Patent Application No. 60/841,217 filed on Aug. 31, 2006, which is incorporated herein by reference in its entirety.

FIELD OF THE INVENTION

The present invention relates to apparatus and methods for measuring global position.

BACKGROUND OF THE INVENTION

The basic functionality of a Global Positioning System (GPS) receiver is determining its position by computing time delays between transmission and reception of signals transmitted from a network of GPS satellites above the earth's surface, which are received by the receiver on or near the surface of the earth. The GPS satellites transmit to the receiver absolute time information associated with the satellite signal. A respective time delay resulting from signal transmission from each of the respective satellites to the receiver is multiplied by the speed of light to determine the distance from the receiver to each of the respective satellites from which data is received. This distance is known as the pseudorange. If fewer than three satellites are used to determine a position, the distance may not be precisely determinable due to an offset between an oscillator in the receiver generating a clock signal for the receiver and the timing signal to which the satellites are synchronized. The GPS satellites also transmit to the receivers satellite-positioning data, generally known as ephemeris data.

The timing signal from each satellite includes a time tag that is used by the receiver to determine when each received signal was transmitted by each respective satellite. By knowing the exact time of transmission of each of the signals, the receiver uses the ephemeris data to calculate where each satellite was when it transmitted a signal. The receiver then combines the knowledge of respective satellite positions with the computed distances to the satellites to determine the receiver's position.

Position calculations generated from satellite signals require pseudorange measurements, ephemeris data, and absolute time of transmission, from four satellites or more to determine a three dimensional position estimate of the GPS receiver's location, which includes latitude, longitude and altitude. Measurement information from three satellites is needed to determine a two dimensional position estimate of the GPS receiver's location, which includes latitude and longitude.

Other Global Navigation Satellite Systems (GNSS) operate using similar principles as GPS described above.

Existing standardised assistance data used in GPS signal acquisition is described in the 3GPP ETSI Technical Specification 04.31.) This assistance data may include the following: coarse time, date; coarse position; fine time, Doppler for satellite with respect to a stationary receiver; almanac; ephemerides; UTC model. Some manufacturers provide their own assistance data.

SUMMARY OF THE INVENTION

The current use of assistance data is limited in its scope in that it provides no data specific to the nature of the local environment. This means a receiver may have no knowledge of the environment in an area local to the receiver. As a result, the receiver is unaware and/or incapable of determining when satellites may be occluded from the view of the receiver. With knowledge of the environment in an area local to the receiver, for example topographical data, the receiver can use the topographical data to make decisions regarding control of the receiver. Such decisions may enable the receiver to: determine if the receiver is operating in a location that is likely to be influenced by multipath; control how the receiver will operate in a location that is likely to be influenced by multipath; control power consumption of the receiver; control at least one of selection, acquisition and tracking a signal from at least one source providing global positioning information; and control position determination performed by the receiver.

According to a first aspect of the invention, there is provided an apparatus for a receiver, the receiver having circuitry configured to receive signals from at least one source providing global positioning information, the apparatus comprising: an interface configured to receive data, the data being other than a receiver position estimate determined by the receiver, that describes an aspect of the environment in an area local to the receiver; and a receiver controller configured to use the data to control operation of the receiver.

In some embodiments, the data comprises topographical data for describing a topographical aspect of an area local to the receiver. The topographical data may include at least one of data pertaining to at least one architectural feature in an area local to the receiver and data pertaining to at least one geographical feature in an area local to the receiver. Particular examples of the data may include: width of at least one street in an area local to the receiver; orientation of at least one street in an area local to the receiver; height of at least one feature in an area local to the receiver; data indicative of one or more properties of one or more material(s) of at least one feature in an area local to the receiver; data indicative of at least one change in elevation in an area local to the receiver; and altitude information in an area local to the receiver.

In some embodiments, the receiver controller is configured to interpret the data to make a decision to control operation of the receiver.

In some embodiments, the receiver controller further comprises one or more of: a multipath influence determiner configured to use the data to determine if the receiver is positioned in a location that is likely to be influenced by multipath; a multipath influence controller configured to use the data to control how operation of the receiver in a location that is likely to be influenced by multipath; a power consumption controller configured to use the data to control power consumption of the receiver; a selection/acquisition/tracking controller configured to use the data to control one or more of selection, acquisition and tracking a signal from at least one vehicle providing global positioning information; a position determination controller configured to use the data to control position determination performed by the receiver; and a navigation controller configured to use the data to control a navigation function of the receiver.

In some embodiments, the multipath influence determiner is configured to perform at least one of: determine at least one probable source of multipath; predict if at least one or a plurality of topographical feature(s) in an area local to the receiver will cause one or more multi-path component(s) of signal(s); provide an indication of the presence of one or more multi-path component(s) of signal(s); and one or more of predict, estimate, determine and provide an indication of the magnitude of one or more multi-path component(s) of signal(s).

In some embodiments, the receiver controller is configured to use the data to determine whether the at least one source providing global positioning information, which is above the horizon, is likely to be visible to the receiver. To determine whether the at least one source providing global positioning information is likely to be visible to the receiver, the receiver controller may compare an estimated position of the at least one source with topographical data that indicates whether or not a feature defined in the topographical data would block receipt of a signal from the at least one satellite by the receiver.

Furthermore, in some embodiments, if the receiver controller determines that the at least one source providing global positioning information is visible to the receiver, the receiver controller enables the receiver to search for the at least one source to acquire a signal; and if the receiver controller determines that the at least one source providing global positioning information is not likely to be visible to the receiver, the receiver controller stops the receiver from searching for the at least one source to acquire a signal.

In some embodiments, the interface is configured to access a computer readable medium for storing the data. The computer readable medium may be collocated with the receiver. The data may be provided and/or updated from one or more suitable sources, for example, by connecting to a receiver including the apparatus to a data source. The data may be provided and/or updated from one or more source(s) located remotely from the receiver. The receiver may be configured to request the data from the one or more source(s), and/or the receiver may be configured to receive the data without the need for the receiver sending a request to the one or more source(s).

In some embodiments, the apparatus described herein may be part of a global positioning system receiver for receiving signals from at least one source providing global positioning information. Such a receiver may further include: receive circuitry configured to receive signals from at least one source providing global positioning information; a signal processor configured to acquire signals from the at least one source providing global positioning information and configured to receive control information from the receiver controller; and a position determiner configured to determine one or more receiver position estimate(s) using the received signals from at least one source and configured to receive control information from the receiver controller.

According to a second embodiment of the invention, there is provided a method for use in a receiver, the receiver having circuitry configured to receive signals from at least one source providing global positioning information, the method comprising: receiving data, the data being other than a receiver position estimate determined by the receiver, that describes an aspect of the environment in an area local to the receiver; and using the data to control operation of the receiver.

In some embodiments, using the data to control operation of the receiver comprises interpreting the data and making a decision to control operation of the receiver.

In some embodiments, when the data includes altitude data for an area local to the receiver, the method further comprising using the altitude data for controlling the determination of a receiver position estimate calculated by the receiver. In some embodiments, using the altitude data for controlling the determination of a receiver position estimate calculated by the receiver comprises using the altitude data and signals from a minimum of two sources providing global positioning information when determining a two-dimensional position estimate of the current position of the receiver. In some embodiments, using the altitude data for controlling the determination of a receiver position estimate calculated by the receiver comprises using the altitude data and signals from a minimum of three sources providing global positioning information when determining a three-dimensional position estimate of the current position of the receiver.

According to a third aspect of the invention, there is provided computer readable medium having stored thereon program instructions executable by a processor of a receiver, the receiver having circuitry configured to receive signals from at least one source providing global positioning information, for causing the computing device to perform: receiving data, which is independent of receiver position data determined by the receiver, and which defines an aspect of the environment in an area local to the receiver; and using the data to control operation of the receiver.

According to a fourth aspect of the invention, there is provided a memory for storing data for access by at least one application program being executed on receiver that receives signals from at least one source providing global positioning information comprising: a data structure stored in said memory, the data structure including information resident in a database used by said application program and including: data in the form of at least one of: (1) at least one architectural feature in an area local to the receiver; and (2) at least one geographical feature in an area local to the receiver; wherein the data is used by the at least one application program to control operation of the receiver.

In some embodiments, the memory is a computer readable medium that is at least one of: (1) a component collocated with the receiver; and (2) a component of an apparatus remote from the receiver that is accessible by the receiver.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the drawings in which.

DETAILED DESCRIPTION OF THE EMBODIMENTS OF THE INVENTION

Figure 1:
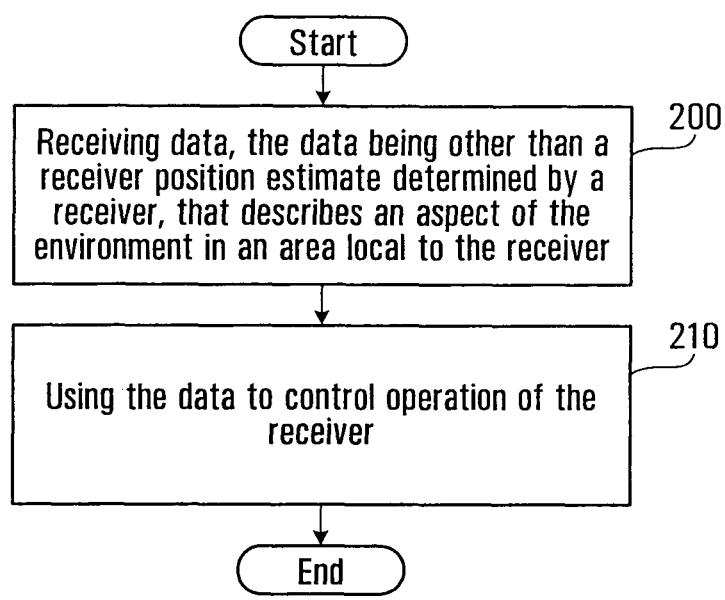
FIG. 1 is a flow chart describing a method of using assistance data for controlling a receiver according to an embodiment of the invention.

A receiver for receiving global positioning information described herein below may be a receiver for use in a Global Navigation Satellite System (GNSS). Exemplary types of GNSS include Global Positioning System (GPS), Galileo, Global Navigation Satellite System (GLONASS), Wide Area Augmentation System (WAAS) and European Geostationary Navigation Overlay Service (EGNOS). Moreover, the use of global positioning information is not to be limited to information for only GPS, but is intended to be information generated, processed, and/or transmitted by any type of GNSS signal source, which is used for determining a position estimate. Similarly, a source of a signal, for example, a space vehicle or satellite, and the signal transmitted by such a source can be a source configured to one or more of generate, process, and transmit one or more signals for one or more of these types of GNSS.

Embodiments of the invention include the provision of data to a GNSS receiver, for example topographical data, such that the receiver can use the data to decide on a further action to be performed. The topographical data may include one or both of geographical data and architectural data. Geographical data may include information about natural formations, such as hills, valleys, forests, etc. Architectural data may include information about manmade formations, such as streets, buildings, bridges, etc. The data may be generally referred to as assistance data.

A practical embodiment of the invention may include at least some of the following:
1. A source of geographic and/or architectural information, typically held by a mapping software application or a database and including, for example, information about street widths and directions of flow, building heights, building materials, elevation changes, local height above geoid. A geoid is an equipotential surface which approximately coincides with the mean ocean surface. It is often referred to as a close representation or physical model of the Earth. It is the equipotential surface which coincides on average with mean sea level.
2. An acquisition and navigation receiver capable of using some or all of this information to improve performance of: signal acquisition; speed or accuracy of position calculation; navigation capability; predicted position; source selection (which signals to search for) and/or to reduce power consumption.
3. An interface between the source of this information and the receiver making use of it, whether or not the two are collocated.

In some embodiments, the assistance data is generated before it is used and stored at a given location to be accessed and received by functional components of the receiver that will use the assistance data. In some embodiments, the assistance data that is received is based on the last known position and/or direction of the receiver. In some embodiments, the assistance data stored at the given location may be updated, based on new information about an aspect of the environment local to the receiver. In some embodiments, the assistance data is used in combination with assistance data stored at a different location. In some embodiments, the assistance data is received on demand by the receiver immediately before use. For example, a user of a GNSS receiver may input a current location, e.g. street address, to the receiver, and based on that input, the receiver may request and receive assistance data pertaining to an aspect of the environment local to the current location of the receiver as defined by the user input.

In operation, the receiver may use information provided by or found in an assistance data database to determine which satellites are likely to be visible over or around one or more geographic feature(s) or one or more architectural feature(s) that block(s) (occludes) a signal transmitted by one or more satellite(s). The receiver may use this information to determine probable sources of multipath and/or to calculate or estimate such effects. The receiver may use this information to determine the likely effects of combined or reflected signals on the dynamic range of received signals, or one or more other factors, that would or could impact the search for, or acquisition of, satellite signals and/or the calculation of the position of the receiver. The receiver may predict multipath using data such as a street's width and/or direction, which side of the street the receiver is on and/or the height of one or more nearby building(s). The expression "multipath" in this context refers to a phenomenon in which a transmitted signal is reflected by intervening objects such as mountains, buildings or other structures one or more times before it reaches the GNSS receiver. The reflection(s) cause the path length of the signal to increase in comparison with a direct path, thereby increasing the measured pseudorange. The reflected signal may interfere destructively with the direct path signal, reducing its strength.

In some embodiments, methods and apparatus configured to implement the methods use information from the database to predict or select times when specific satellites are known to come into view of the receiver in order to control power consumption (e.g. reduce or optimize) or aid in selection of satellites to acquire and/or track.

Some embodiments of the invention allow the receiver to make use of specific information about the environment in an area local to the receiver that has not previously been an element or ingredient of assistance data. A receiver may use this data to improve its performance in any of a number of ways. In particular, one advantage that cannot be achieved with conventional receivers is to decide when it is worthwhile searching for a particular satellite according to the likelihood that its signal is above the horizon, but occluded from view of the receiver, by a geographical or architectural feature between the particular satellite and the receiver.

In some embodiments of the invention, the methods described herein aid in controlling power consumption at the receiver. This may result in improved battery life performance. For instance, if the assistance data indicates that a satellite signal is likely to be very difficult to detect, the receiver need not spend long periods of time performing a power-intensive search. Conversely, the assistance data may indicate when this satellite signal is likely to be relatively easy to detect, for example, possibly after a period of occlusion.

Another benefit arising from the assistance data is the provision of altitude data. A good estimate of altitude in an area local to the receiver, which can be provided in the assistance data, allows the receiver to calculate a two-dimensional position from measured pseudoranges using a minimum of signals from at least two sources. A three-dimensional position may be determined using a minimum of signals from at least three sources. In either of the two or three-dimensional cases, having more than two or three signals respectively, may enable the position estimate to be more accurate. The accuracy of the position estimate may be improved in such cases due to having a larger number of known values than unknown values when determining the receiver position, resulting in what can be referred to as an over-determined solution.

As described above, the magnitude of the multipath component of one or more signals may be predicted, making the at least one signal easier to detect, and the effect of the multipath component may be ameliorated. By performing at least one of predicting and detecting the magnitude of multipath, a millisecond ambiguity occurring in a receiver position calculation, which may be indicated in a clock offset between the receiver clock and a satellite clock, may be resolved. See applicant's co-pending application no. PCT/CA2007/001520, published as publication no. WO 2008/025151, titled "APPARATUS AND METHOD FOR USE IN GLOBAL POSITION MEASUREMENTS" for examples of how multipath may be predicted and how the millisecond ambiguity occurring in the position calculation can be determined and/or compensated.

The methods described herein include obtaining the data, from/with a database collocated with the receiver and/or accessed by the receiver from a source at a location remote from the receiver. In some embodiments, the source at the location remote from the receiver may be a server, optionally dedicated to provide such information. More generally, the assistance data source may be a multipurpose server, one purpose of which is to provide such information. In some embodiments, the source may be another wireless device having an assistance data database.

In some embodiments, the receiver may be a GNSS receiver that is collocated with a mobile or other radio receiver through which the assistance data is communicated.

When the receiver includes a database that is collocated with the receiver, the database may be enabled to be populated with new or updated assistance data from time to time, when requested by the receiver, or received unsolicited by the receiver. The new or updated assistance data received by the receiver may be generated for that particular receiver individually or may be generated for all receivers in a given region and broadcast, to all receivers in that region.

When the receiver accesses a database remote from the receiver for assistance data, the assistance data received by the receiver may be generated for that particular receiver individually or may be generated for any receiver in a given region and broadcast to all receivers in that region.

An example of a method using data to control a receiver will now be described with reference to the flow chart of FIG. 1.

A first step 200 of the method involves receiving data, the data being other than a receiver position estimate determined by the receiver, that describes an aspect of the environment in an area local to the receiver. A second step 210 of the method involves using the data to control operation of the receiver.

The data may be topographical data for describing a topographical aspect of an area local to the receiver. The topographical data may include data pertaining to at least one architectural feature in an area local to the receiver and/or data pertaining to at least one geographical feature in an area local to the receiver. The data may in particular include one, some or all of: width of at least one street in an area local to the receiver; directional orientation of at least one street in an area local to the receiver; height of at least one feature in an area local to the receiver; data indicative of one or more properties of one or more material(s) of at least one feature in an area local to the receiver; data indicative of at least one change in elevation in an area local to the receiver; and altitude information in an area local to the receiver. A "feature" may be a manmade structure such as buildings, bridges, etc. or natural formations such as trees, hills, etc.

Using the data to control operation of the receiver may involve interpreting the data and making a decision to control a particular one or more operation(s) of the receiver.

Controlling the operation of the receiver may include performing one or more of: (1) using the data to determine if the receiver is positioned in a location that is likely to be influenced by multipath; (2) using the data to control operation of the receiver in a location that is likely to be influenced by multipath; (3) using the data to control power consumption of the receiver; (4) using the data to control one or more of selection, acquisition and tracking a signal from at least one source providing global positioning information; (5) using the data to control position determination performed by the receiver; and (6) using the data to control a navigation function of the receiver.

In some embodiments, when the data includes altitude data for an area local to the receiver, the method may further include using the altitude data for controlling the determination of a receiver position estimate calculated by the receiver. For example, the altitude data may be used in combination with signals from a minimum of two sources providing global positioning information when determining a two-dimensional position estimate of the current position of the receiver.

In another embodiment, altitude data may be used in combination with signals from a minimum of three sources providing global positioning information when determining a three-dimensional position estimate of the current position of the receiver.

Figure 2A:
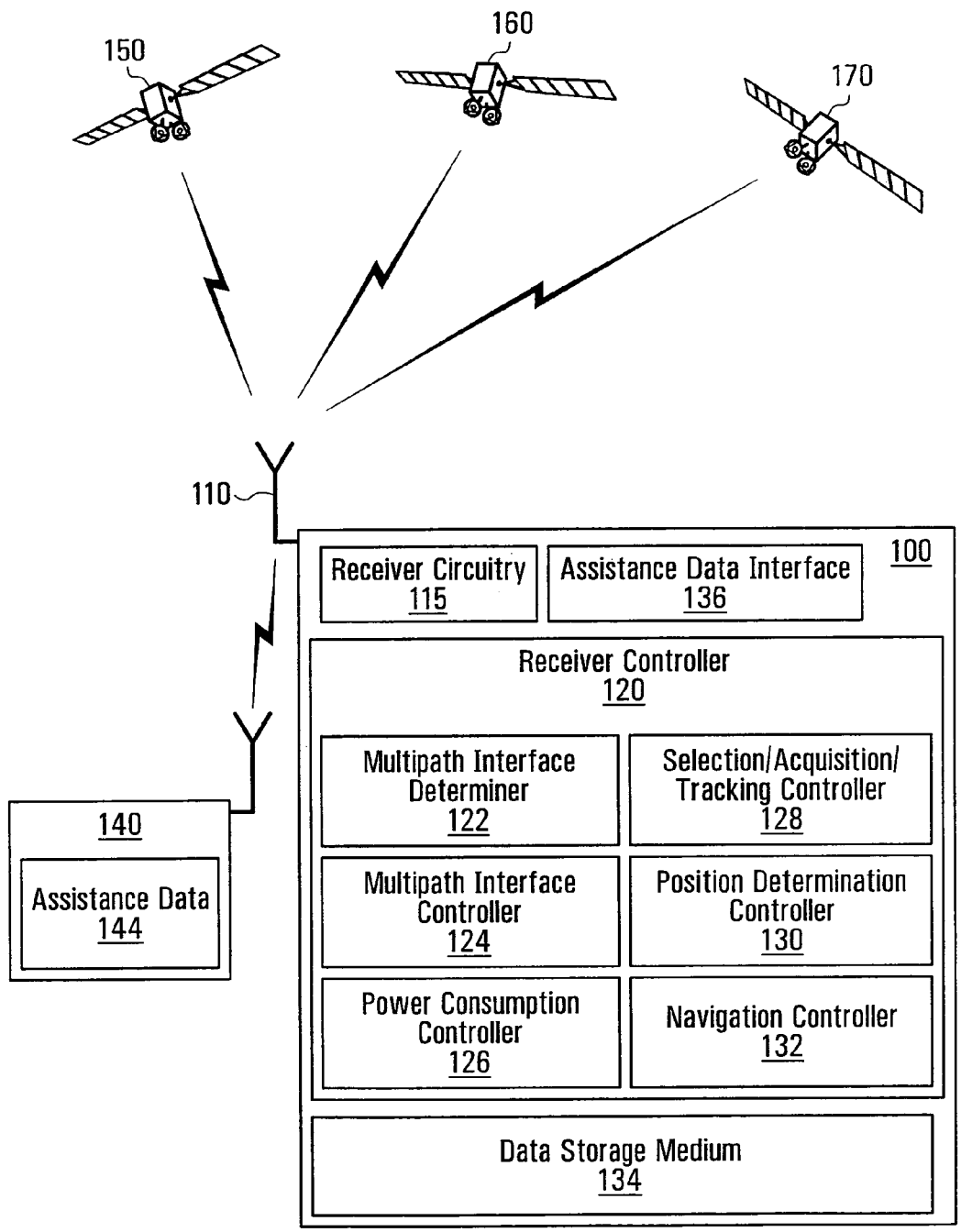
FIGS. 2A and 2B are block diagrams of examples of receivers configured to implement embodiments of the invention.

An example of a receiver according to an embodiment of the invention will now be described with reference to FIG. 2A. FIG. 2A illustrates a receiver 100 in communication with three satellites, Space Vehicle 150, Space Vehicle 160 and Space Vehicle 170. While only three satellites are shown in communication with the receiver, it is to be understood that the receiver may be in contact with one, two, or greater than three satellites at any given point in time. Also illustrated in FIG. 2A is a wireless enabled device 140, located remotely from the receiver, which in some embodiments, is configured to provide assistance data to the receiver 100.

In the illustrated example, the receiver 100 includes an antenna 110 for receiving signals from the one or more satellites. Only a single antenna is indicated in FIG. 2A, but multiple antennas could be used for receiving signals from one or more satellites. The antenna 110 is shown to receive data from wireless device 140. However, it is to be understood that a separate at least one antenna, independent from the antenna used to receive signals from the satellites, could be used to receive assistance data from the wireless device 140.

In the illustrated example, the receiver 100 includes receiver circuitry 115, a receiver controller 120, a data storage medium 134, and an assistance data interface 136. The receiver controller 120 as described herein is intended to be a receiver controller responsive to the assistance data, not to be confused with a primary receiver controller which controls all aspects of the receiver's operation, although the receiver controller may be incorporated in the primary receiver controller or may be separate therefrom. In some embodiments, this receiver controller may provide such a primary receiver controller with information to allow the primary receiver controller to control operation of the receiver more efficiently or with improved performance, as described herein. In some embodiments, a single processor may be used to implement both the receiver controller and the primary receiver controller. The receiver controller 120 is shown to include a multipath influence determiner 122, a multipath influence controller 124, a power consumption controller 126, a selection/acquisition/tracking controller 128, a position determination controller 130, and a navigation controller 132. These are particular examples of components for using assistance data to control the receiver. The components are represented in FIG. 2A as separate functional blocks, but it is to be understood that depending on a given implementation, i.e. software, hardware, firmware, or some combination of those three, multiple functional blocks may be combined in one or more multi-component functional block(s), each containing one or more of the above described functional blocks. Not all of these components are necessarily included in all embodiments of implementations of the invention. Other embodiments may comprise any one of these components. Furthermore, other and/or additional components for using data to control other functions of the receiver in accordance with to the intended scope of the invention are contemplated.

In operation, the receiver circuitry 115 is configured to receive signals from the antenna 110 from at least one source that is providing global positioning information. In some embodiments, the received signals are passed to other components of the receiver 100, for example, hardware and/or software for determining position estimates based on received satellite information, which determine one or more parameters associated with the receiver. In some embodiments, the received signals are passed to the receiver controller 120.

The receiver circuitry 115 may be configured to receive assistance data from the wireless device 140 via the antenna 110. In some embodiments, the assistance data is passed to the receiver controller 120. The assistance data may be provided to any of the various components 122,124,126,128, 130,132 described above for use by those respective components.

In some embodiments, the multipath influence determiner 122 is configured to use the data to determine if the receiver is operating in a location that is likely to be influenced by multipath. The multipath influence determiner 122 is configured to perform one or more of: (1) determining probable sources of multipath; (2) predicting if at least one or a plurality of topographical feature(s) in an area local to the receiver will cause one or more multi-path component(s) of signal(s); (3) providing an indication of the presence of one or more multi-path component(s) of signal(s); and (4) one or more of predicting, estimating, determining and providing an indication of the magnitude of one or more multi-path component(s) of signal(s).

In some embodiments, the multipath influence controller 124 is configured to use the data to control how the receiver will operate in a location that is likely to be influenced by multipath.

In some embodiments, the power consumption controller 126 is configured to use the data to control power consumption of the receiver. For example, the power consumption controller 126 may use assistance data to perform one or more of reducing and optimizing power consumption in the receiver.

In some embodiments, the selection/acquisition/tracking controller 128 is configured to use the data to control one or more of selection, acquisition and tracking a signal from at least one source providing global positioning information. For example, the selection/acquisition/tracking controller 128 may determine one or more likely effect(s) of combined or reflected signals on the dynamic range of at least one received signal, or of one or more other factor(s), on the dynamic range of at least one received signal, that may affect how the search, acquisition and/or tracking of signals may be performed by the receiver.

In some embodiments, the position determination controller 130 is configured to use the data to control position determination performed by the receiver 100. For example, the position determination controller 130 may determine one or more likely effect(s) of combined or reflected signals on the dynamic range of at least one received signal, or of one or more other factor(s), on the dynamic range of at least one received signal, that may affect how position determination may be performed by the receiver 100.

In some embodiments, the receiver controller 120 is configured to use the data to determine whether at least one vehicle 150,160,170 providing global positioning information, which is above the horizon, is likely to be visible to the receiver 100. For example, the receiver controller 120 may determine whether the at least one source 150,160,170 providing global positioning information is likely to be visible to the receiver 100 by comparing an estimated position of the at least one source with topographical data that indicates whether or not a feature defined in the topographical data would block receipt of a signal from the at least one satellite by the receiver 100. In some embodiments, if the receiver controller 120 determines that the at least one source providing global positioning information is visible to the receiver, the receiver controller 120 enables the receiver 100 to search for the at least one source so as to acquire a signal. If the receiver controller 120 determines that the at least one source providing global positioning information is not likely to be visible to the receiver 100, the receiver controller 120 may stop the receiver 100 from searching for the at least one source to acquire a signal. Either one of or both of the selection/acquisition/tracking controller 128 and the power consumption optimizer 126 may perform a method as described above to control selection and acquisition of satellites. In so doing, the receiver controller 120 may optimize the power consumption of the receiver 100.

In some embodiments, the navigation controller 132 is configured to use the data to control a navigation function of the receiver. For example, if the receiver provides navigation instructions to a user, the data may be used to modify navigation instructions provided by a functional element of the receiver to guide a user on a path that will be less affected by topographical features that could in some manner effect how accurately position estimates are calculated.

In the illustrated example, the receiver 100 includes the data storage medium 134 (e.g. a memory), for storing information that may be used by the receiver controller. This may include, for example, temporary storage of assistance data, or storage of information predicted, estimated, determined, or calculated by any of the various components 122,124,126, 128,130,132 described above, which may be used to control operation of the receiver.

In some embodiments, the receiver controller 120 can be physically implemented using software, hardware, firmware or any combination thereof. As particular examples not meant to limit the invention, a hardware implementation may include using application specific integrated circuits (ASIC) or field programmable gate arrays (FPGA). To implement the functional components in software, in some embodiments a microprocessor capable of performing basic digital signal processing operations is utilized. Embodiments of the invention may be carried out in a processing chip in the GNSS receiver.

In some embodiments, the assistance data interface 136 is configured for enabling access between assistance data 144 located in the wireless device 140 and the receiver controller 120. The assistance data interface 136 may be a physical connection, for example electrical couplers or a bus controlled by hardware or software or a logical interface, for example, implemented in software.

Figure 2B:
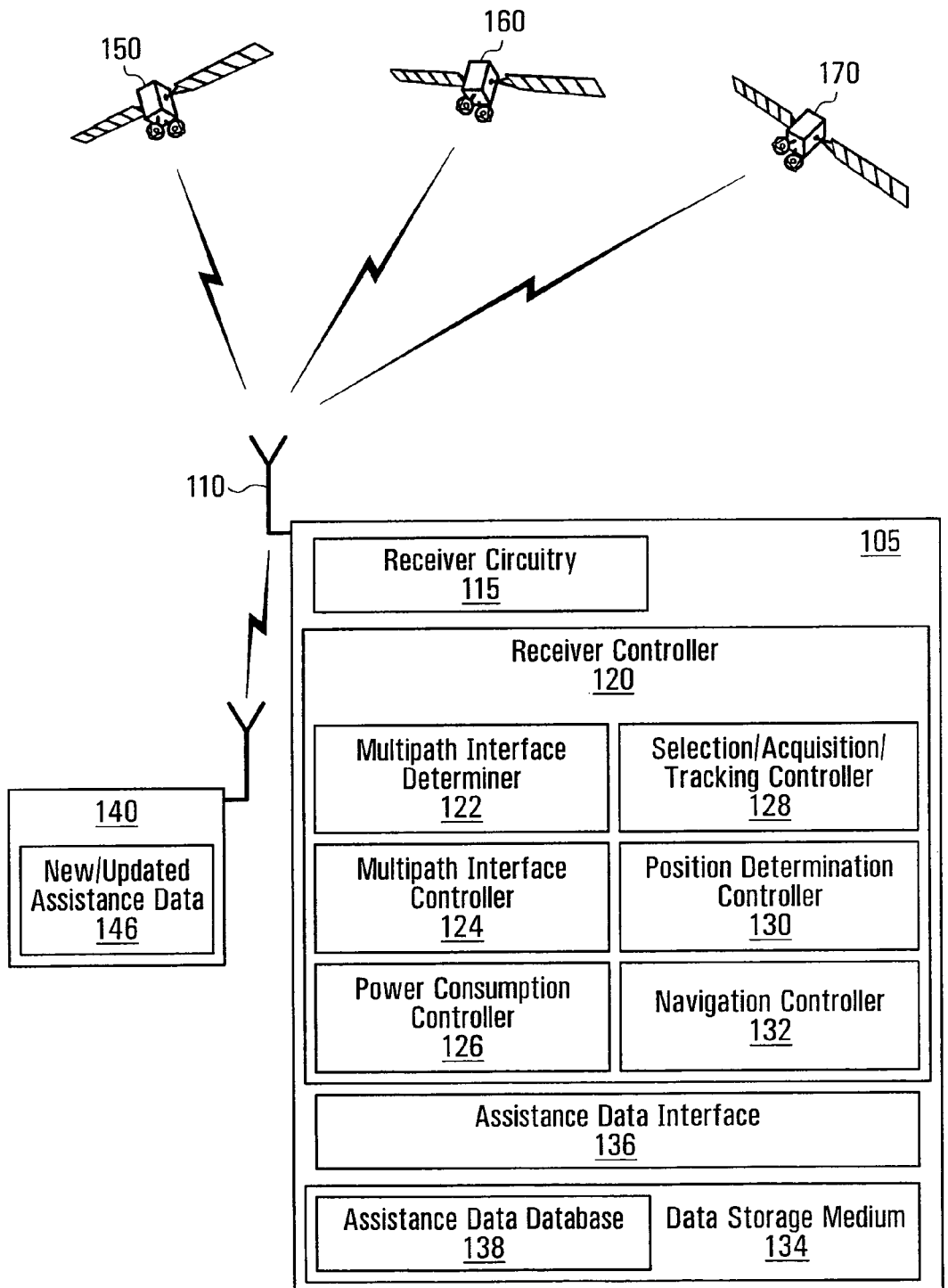

An example of a receiver 105 according to another embodiment of the invention will now be described with reference to FIG. 2B. The receiver of FIG. 2B is similar to the receiver of FIG. 2A, except that the receiver of FIG. 2B includes a database for storing assistance data at the receiver 105. In this embodiment, an assistance data database 138 is part of the receiver 105. The assistance data interface 136 is used by the receiver 105 to access the assistance data database 138 when the receiver controller 120 needs information about the environment local to the receiver 105, which is stored in the assistance data database 138.

The assistance data database 138 includes for example architectural environment information and/or geographical environment information. Information regarding an aspect of an area local to the receiver can be determined from the assistance data database 138. The assistance data database 138 may be stored on a computer readable medium and be accessible by other hardware and/or software components of the receiver 105. Examples of such other hardware and/or software components may include a component that is responsible for one or more of selecting, acquiring and tracking satellites or a component that is responsible for determining receiver position.

In FIG. 2B wireless device 140 may be accessed by the receiver controller via the interface 136. The wireless device 142 may contain new or updated assistance data 146 that can be used in combination with assistance data stored in assistance data database 138 or may be used to replace assistance data stored in assistance data database 138.

In addition to the particular components described above as components in the receivers 100,105 that are related to the invention, the receivers 100,105 are considered to have other components related to the normal operation of the receiver, for example transmit circuitry, hardware and/or software for acquiring and tracking satellites, and hardware and/or software for determining position estimates based on received satellite information. The other components may be configured to receive information from the functional blocks that have used the assistance data, which allows the other components to be controlled by the receiver controller. Hardware and/or software for acquiring and tracking satellites may include a signal processor configured to acquire signals from the at least one source providing global positioning information. The signal processor may include a correlating engine used to correlate one or more received signal(s) from one or more source(s) to determine which source the one or more received signal(s) is from.

Figure 3:
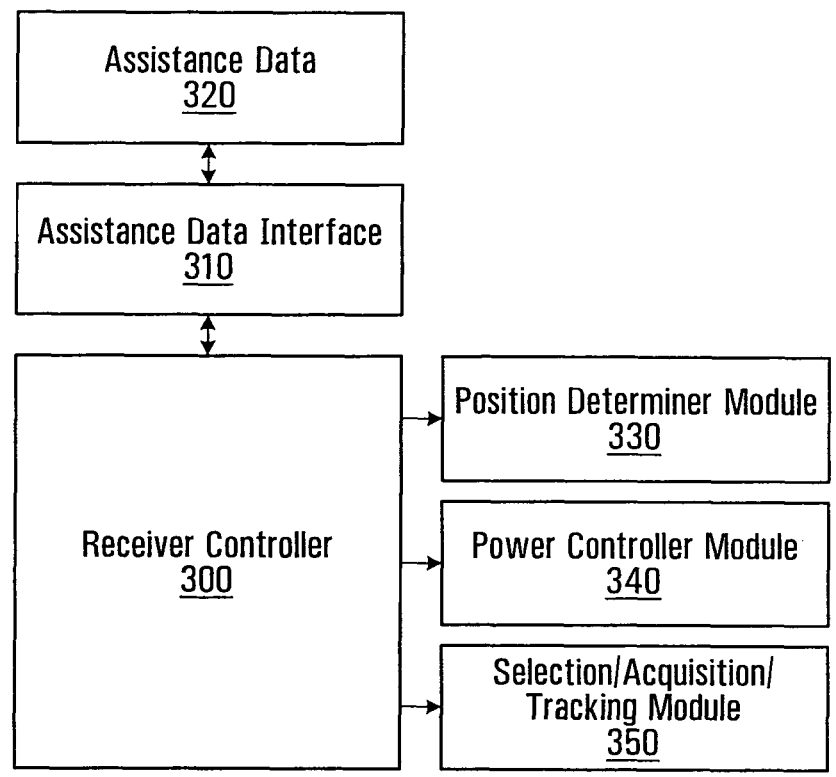
FIG. 3 is a block diagram of an exemplary implementation of a receiver controller responsive to assistance data according to an embodiment of the invention.

FIG. 3 shows a more detailed example of how the receiver controller, responsive to the assistance data, may interact with other components in the receiver. FIG. 3 illustrates a receiver controller 300 in two way communication with an assistance data interface 310. The assistance data interface 310 is shown to be in two way communication with the assistance data 320. As described above, the assistance data may be, for example, in a database that is either collocated with the receiver or that is located remotely from the receiver. The receiver controller 300 is also shown providing outputs to a position determiner module 330, a power controller module 340 and a selection/acquisition/tracking module 350.

The receiver controller 300 uses the assistance data to interpret the assistance data and make a decision to control one or more operations of the receiver. For instance, the assistance data may be interpreted and a decision made pertaining to selection of a satellite. For example, a particular satellite is determined to be occluded by a building whose location and height is described in the assistance data, and is therefore not likely to be visible to the receiver. The receiver controller 300 is capable of determining this based on the assistance data and sends a message or some other form of output to the selection/acquisition/tracking module 350, which is responsible for selecting, acquiring and/or tracking satellites. With such a message or output from the receiver controller 300, the selection/acquisition/tracking module 350 can ultimately decide not to try to acquire the satellite. Alternatively, the receiver controller 300 may provide a similar message or output to the power controller module 340. The power controller module 340 may use the message or output to ensure that the receiver does not perform a search for the satellite, and by doing so mitigates wasting power on a search that would at that point in time most likely prove to be ineffective. In another example, the assistance data 320 may include altitude data, and this altitude data could be provided to the position determiner module 330, which is responsible for using at least one signal from one or more satellites to determine a position estimate for the receiver. With the altitude information provided by the receiver controller 300, the position determiner module 330 can calculate the position estimate with fewer signals than typically necessary, or possibly improve the accuracy of the position estimate with the number of signals that are typically necessary, i.e. a minimum of three signals for two dimensional position estimate and a minimum or four signals for three dimensional position estimate. These are three examples of how the receiver controller 300 may provide output information to one or more particular component(s) of a receiver illustrating how the assistance data 320 can be used to control the receiver. The receiver controller 300 may be used to control other components in the receiver that are not specifically described herein, but which could be positively affected by the use of assistance data.

Using assistance data may be helpful in determining strategies for controlling, e.g. reducing or optimizing, processor power in a GNSS receiver. Strategies for reducing processor power for a GNSS receiver in a device that shares processing power with other elements in the device may be particularly useful. For example, a cellular telephone that is GPS enabled, may also have an MP3 music player and/or the ability to play video. Any means to mitigate the amount of processing power used for determining a position estimate may be advantageous to avoid the processing power used to determine a position estimate disrupting the processing power needed to play music or video on the cellular telephone.

In some embodiments, the assistance data may be used by the receiver to control functional elements of the receiver in a proactive manner. For example, this may include using the data in an attempt to ensure that the receiver navigates a path that will allow it to receive information from a sufficient number of sources substantially at all times to maintain accurate position determination.

Numerous modifications and variations of the present invention are possible in light of the above teachings. It is therefore to be understood that within the scope of the appended claims, the invention may be practised otherwise than as specifically described herein.

The invention claimed is:

1. An apparatus for a receiver having circuitry configured to receive signals from at least one source providing global positioning information, the apparatus comprising:
    an interface configured to receive topographical data that describes an aspect of an environment in an area local to the receiver; and
    a receiver controller configured to compare an estimated position of the at least one source providing global positioning information with the topographical data to determine whether a topographical feature defined in the topographical data would block receipt of the signals from the at least one source by the receiver and to modify navigational instructions provided by the receiver to a user to guide the user on a path that is less affected by a topographical feature that has been determined to block receipt of the signals.

2. The apparatus of claim 1 wherein the topographical data describes a topographical aspect of the area local to the receiver.

3. The apparatus of claim 1 wherein the topographical data includes at least one of data pertaining to at least one architectural feature in the area local to the receiver and data pertaining to at least one geographical feature in the area local to the receiver.

4. The apparatus of claim 1 wherein the topographical data includes one or more of:
    width of at least one street in the area local to the receiver;
    orientation of at least one street in the area local to the receiver;

height of at least one topographical feature in the area local to the receiver;

data indicative of one or more properties of one or more materials of at least one topographical feature in the area local to the receiver;

data indicative of at least one change in elevation in the area local to the receiver; and altitude information in the area local to the receiver.

5. The apparatus of claim 1 wherein the receiver controller is configured to interpret the topographical data to make a decision to control operation of the receiver.

6. The apparatus of claim 1 wherein the receiver controller further includes one or more of:

a power consumption controller configured to use the topographical data to control power consumption of the receiver;

a selection/acquisition/tracking controller configured to use the topographical data to control one or more of selection, acquisition and tracking of a signal from the at least one source providing global positioning information; and a position determination controller configured to use the topographical data to control position determination performed by the receiver.

7. The apparatus of claim 1 wherein the receiver controller is further configured to perform at least one of:

determine at least one probable source of multipath;

predict if at least one of the topographical features in the area local to the receiver will cause one or more multi-path components of signals;

provide an indication of a presence of one or more multi-path components of signals; and one or more of predict, estimate, determine and provide an indication of a magnitude of one or more multi-path components of signals.

8. The apparatus of claim 6 wherein the selection/acquisition/tracking controller is configured to determine one or more effects of combined or reflected signals on a dynamic range of at least one received signal that affects how at least one of searching, tracking and acquiring signals is performed by the receiver.

9. The apparatus of claim 6 wherein the position determination controller is configured to determine one or more effects of combined or reflected signals on a dynamic range of at least one received signal that affects how the position determination is performed by the receiver.

10. The apparatus of claim 1 wherein the receiver controller is configured to use the topographical data to determine whether the at least one source providing global positioning information, which is above a horizon, is visible to the receiver.

11. The apparatus of claim 10 wherein when the at least one source providing global positioning information is visible to the receiver, the receiver controller enables the receiver to search for the at least one source to acquire a signal.

12. The apparatus of claim 1 wherein the interface is configured to access a computer readable medium for storing the data.

13. The apparatus of claim 12 wherein the computer readable medium is one of collocated with the receiver and located remotely from the receiver.

14. A global positioning system receiver for receiving signals from at least one source providing global positioning information comprising the apparatus of claim 1.

15. The receiver of claim 14 further comprising:

receive circuitry configured to receive signals from the at least one source providing global positioning information;

a signal processor configured to acquire signals from the at least one source providing global positioning information and configured to receive control information from the receiver controller; and a position determiner configured to determine one or more receiver position estimates using the received signals from the at least one source and configured to receive the control information from the receiver controller.

16. A method for use in a receiver having circuitry configured to receive signals from at least one source providing global positioning information, the method comprising:

receiving topographical data that describes an aspect of an environment in an area local to the receiver;

comparing an estimated position of the at least one source providing global positioning information with the topographical data that indicates to determine whether a topographical feature defined in the topographical data would block receipt of the signals from the at least one source by the receiver, and modifying navigational instructions provided by the receiver to a user to guide the user on a path that is less affected by a topographical feature that has been determined to block receipt of the signal.

17. The method of claim 16 wherein the topographical data describes a topographical aspect of the area local to the receiver.

18. The method of claim 16 wherein the topographical data includes at least one of data pertaining to at least one architectural feature in the area local to the receiver and data pertaining to at least one geographical feature in the area local to the receiver.

19. The method of claim 16 wherein the topographical data includes one or more of:

width of at least one street in the area local to the receiver;

orientation of at least one street in the area local to the receiver;

height of at least one topographical feature in the area local to the receiver;

data indicative of one or more properties of one or more materials of at least one topographical feature in the area local to the receiver;

data indicative of at least one change in elevation in the area local to the receiver; and altitude information in the area local to the receiver.

20. The method of claim 16 further comprising using the topographical data to control operation of the receiver.

21. The method of claim 16 further comprising using the topographical data to control power consumption of the receiver.

22. The method of claim 16 further comprising using the topographical data to determine if the receiver is positioned in a location that is influenced by multipath.

23. The method of claim 16 further comprising using the topographical data to control selection, acquisition and tracking of a signal from the at least one source providing global positioning information.

24. The method of claim 16 further comprising using the topographical data to control position determination performed by the receiver.

25. The method of claim 16 further comprising using the topographical data to determine whether the at least one source providing global positioning information, which is above a horizon, is visible to the receiver.

26. The method of claim 25 wherein when the at least one source providing global positioning information is visible to the receiver, enabling the receiver to search for the at least one source to acquire a signal.

27. The method of claim 16 further comprising, when the topographical data includes altitude data for the area local to the receiver, using the altitude data for controlling a determination of the receiver position estimate calculated by the receiver.

28. The method of claim 27 wherein using the altitude data for controlling the determination of the receiver position estimate calculated by the receiver includes using the altitude data and signals from a minimum of two sources providing global positioning information when determining a two-dimensional position estimate of a current position of the receiver.

29. The method of claim 27 wherein using the altitude data for controlling the determination of the receiver position estimate calculated by the receiver includes using the altitude data and signals from a minimum of three sources providing global positioning information when determining a three-dimensional position estimate of a current position of the receiver.

30. The apparatus of claim 10 wherein when the at least one source providing global positioning information is not visible to the receiver, the receiver controller is further configured to stop the receiver from searching for the at least one source to acquire a signal.

31. The method of claim 25 further comprising stopping the receiver from searching for the at least one source to acquire a signal when the at least one source providing global positioning information is not visible to the receiver.

32. A system for a receiver having circuitry configured to receive signals from at least one source providing global positioning information, the system comprising:
- a wireless enabled device located remotely from the receiver and configured to provide topographical data that describes an aspect of an environment in an area local to the receiver;
- an interface configured to receive the topographical data; and
- a receiver controller configured to compare an estimated position of the at least one source providing global positioning information with the topographical data to determine whether a topographical feature defined in the topographical data would block receipt of the signals from the at least one source by the receiver and to modify navigational instructions provided by the receiver to a user to guide the user on a path that is less affected by a topographical feature that has been determined to block receipt of the signals.

* * * * *

UNITED STATES PATENT AND TRADEMARK OFFICE
CERTIFICATE OF CORRECTION

| | | |
|---|---|---|
| PATENT NO. | : 8,692,710 B2 | |
| APPLICATION NO. | : 12/310552 | |
| DATED | : April 8, 2014 | |
| INVENTOR(S) | : Tarlow et al. | |

It is certified that error appears in the above-identified patent and that said Letters Patent is hereby corrected as shown below:

On the Title Page, (item 54, Title) at line 2, and in the Specification, in column 1 at line 2, Change "POSITIONING" to --POSITION--.

In the Claims

In column 14 at line 20, In Claim 16, after "data" delete "that indicates".

Signed and Sealed this
Sixteenth Day of September, 2014

Michelle K. Lee
*Deputy Director of the United States Patent and Trademark Office*